2,731,496

METHOD OF MAKING THIOSEMICARBAZIDE

George E. Taylor, St. Louis, Mo., assignor to Monsanto Chemical Company, St. Louis, Mo., a corporation of Delaware No Drawing. Application January 28, 1953, Serial No. 333,840

7 Claims. (Cl. 260—552)

This invention relates to a new and improved method of making thiosemicarbazide.

Thiosemicarbazide,

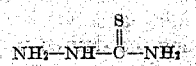

is a well known and highly useful chemical for the manufacture of which many methods have been suggested and employed. However, for one or more reasons not one has been found wholly satisfactory. All are expensive, many are inefficient and time-consuming, while others are difficultly operable and hazardous.

In accordance with this invention it has been found that thiosemicarbazide may be prepared conveniently, rapidly, relatively inexpensively, and safely as well as in improved yields by heating a suspension of hydrazine thiocyanate, $NH_2NH_2 \cdot HSCN$, in a water-immiscible inert organic liquid while maintaining the pH of the system during the rearrangement to thiosemicarbazide below about 6.0. Among the more desirable water-immiscible liquids successfully employed are the hydrocarbons such as toluene, xylene, solvent naphtha, heptane, and kerosene. However, other inert water-immiscible organic liquids may be employed and those having boiling points in the range of from about 100° C. to about 220° C. are particularly preferred.

As illustrative of the novel process of this invention is the following, however, such in no manner is to be construed as limitative thereof.

Example I

To a suitable reaction vessel equipped with a thermometer, stirrer and reflux condenser containing approximately 91 parts by weight of hydrazine thiocyanate is admixed with approximately 66 parts by weight of ammonium sulfate and the mix slurried in approximately 400 parts by weight of a mixture of xylenes. The suspension so obtained is refluxed for about 2 hours at reduced pressure, the temperature during the refluxing being about 115–125° C. During the refluxing period the system is maintained at a pH in the range of about 5.0 to about 6.0. The suspension is then cooled and filtered. The white sandy filter cake so obtained is washed with several small portions of water and then dried at 100° C. A quantitative yield of thiosemicarbazide is obtained.

Although in the above example a range of pH of from about 5.0 to about 6.0 is employed during the rearrangement step, it is to be understood that lower pH's may be employed. However, the employment of a pH in the range of from about 5.0 to about 6.0, and particularly the range of pH from about 5.0 to about 5.5, is necessary for optimum results.

Another aspect of this invention embodies preparing thiosemicarbazide employing as the starting material a water-soluble neutralized hydrazine salt of an inorganic acid except nitric acid. The procedural steps of this embodiment may be represented as follows: (1) react in an aqueous medium a water-soluble neutralized hydrazine salt of an inorganic acid (except nitric acid) with a water-soluble thiocyanate salt, (2) remove the water from the resultant reaction mixture, thereby obtaining a crude residue containing hydrazine thiocyanate

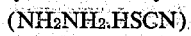

(3) slurry the crude residue so obtained in a water-immiscible inert organic liquid, and then (4) heat the suspension so formed to rearrange the hydrazine thiocyanate while maintaining the pH below about 6.0 during the rearrangement reaction.

Although excellent yields of thiosemicarbazide are obtained when any water-soluble thiocyanate salt reactive with a water-soluble neutralized hydrazine salt of an inorganic acid (except nitric acid) is employed in accordance with this embodiment of the present invention, the preferred thiocyanate reactant is ammonium thiocyanate. Higher yields are obtained with ammonium thiocyanate than when other water-soluble thiocyanates are employed. In fact employing ammonium thiocyanate in accordance with this aspect of the present invention, in general, results in quantitative or substantially quantitative yields. Further, its usage results in essentially a one-step process, e. g., the handling of waste solids during the course of the reaction is eliminated. Furthermore, the usage of ammonium thiocyanate in substantially chemically equivalent amounts as a reactant with a hydrazine salt of an inorganic acid (except nitric acid) in an aqueous medium generally results in an aqueous suspension or solution of the reaction products possessing a pH in the range of 5.0 to 5.5. Upon subjecting such an aqueous suspension or solution to a water removal operation, e. g. vacuum distillation, the hydrazine thiocyanate contained therein exhibits little or no tendency to decompose. Furthermore, the hydrazine thiocyanate containing crude residue obtained upon removing the water from the aforementioned solution or suspension possessing a pH of 5.0 to 5.5 exhibits almost no tendency to decompose when subjected to heat during the subsequent rearrangement reaction. The pH of this aforementioned hydrazine thiocyanate containing crude residue taken at various times during the rearrangement reaction remains constantly below 6.0. As aforenoted, it is essential that the pH of the hydrazine thiocyanate containing residue (that is the pH of an aqueous solution of the hydrazine thiocyanate containing crude residue) during the rearrangement reaction possess a pH not in excess of about 6.0.

As illustrative of this particular embodiment of this invention is the following:

Example II

To a suitable reaction vessel equipped with a thermometer, stirrer and reflux condenser containing approximately 123 parts by weight of 98.5% pure $NH_2NH_2 \cdot H_2SO_4$ and approximately 200 parts by weight of water is added and intimately mixed approximately 125 parts by weight of 28% ammonium hydroxide (aqueous solution) and approximately 78 parts by weight of 98.5% pure ammonium thiocyanate. Upon filtering the filtrate is found to possess a pH of 5.5. The solution or filtrate so obtained is taken to dryness under vacuum. The crude residue is then admixed with approximately 385 parts by weight of kerosene ($d_{27°}$ c. 0.770; B. P. range 115°–205° C.) and the suspension is refluxed at reduced pressure for 3 hours. The temperature at reflux is 120–122° C. During the refluxing period the system maintained a pH of approximately 5.5. The suspension is then cooled and filtered. The white sandy filter cake so obtained is then slurred in approximately 300 parts by weight of water and filtered. Upon washing the filter cake with water and drying at 100° C. a yield (approximately 83 parts by weight) in excess of 96% by weight of theory of pure thiosemicarbazide is obtained.

Other water-soluble thiocyanate reactants than the ammonium salt, e. g., the alkali metal thiocyanates, may be employed as starting materials in accordance with the foregoing aspect of the process of this invention. In such instances it has been found advantageous to include a small quantity of an ammonium salt of a strong acid (except nitric acid) e. g., ammonium sulfate, or an inorganic acid (except nitric acid) e. g., sulfuric acid, in the inert organic liquid suspension of the crude hydrazine thiocyanate in order to reduce decomposition losses during the rearrangement reaction. The ammonium salt or inorganic acid may be added in amounts up to equimolecular proportions, the quantity being determined in each instance as that required to obtain a pH below about 6.0 and preferably in the range of from about 5.0 to about 6.0. Such additives may be incorporated prior to or subsequent to the water removal operation, or during the subsequent rearrangement reaction or any combination thereof. In prior methods, particularly those which employed the alkali metal thiocyanates as starting materials, no control of pH was attempted. In view of the strong alkaline nature of the alkali metal thiocyanates employed, pH values in excess of the critical value, namely about 6.0, were encountered. It is believed that it was as a result of such high pH conditions in the prior methods that the rearrangement reaction was accompanied by the evolution of large quantities of gaseous decomposition products which materially decreased the efficiency of operation. Another difficulty encountered in the prior methods was that the rearrangement reaction was so exothermic and difficultly controllable under large scale operations that explosions were not uncommon. In the process of this invention it has been found that by keeping the pH of the crude hydrazine thiocyanate containing residue below about 6.0 during the rearrangement reaction and by the utilization of the aforementioned inert liquid vehicles in the manner described, the formation of decomposition products is minimized to the point of negligibility and excellent temperature control is effected.

As exemplary of another embodiment of this invention, the following is illustrative:

*Example III*

To a suitable reaction vessel equipped with a thermometer, stirrer, and reflux condenser containing approximately 528 parts by weight of 98.5% pure

NH₂NH₂.H₂SO₄ is added approximately 800 parts by weight of water. The hydrazine salt is neutralized by adding 160 parts by weight of sodium hydroxide dissolved in 400 parts by weight of water. Thereafter there is intimately mixed in the neutralized hydrazine salt solution approximately 310 parts by weight of ammonium thiocyanate. The complete aqueous solution so obtained is adjusted to a pH of 5.0 by the addition of a small amount of sodium carbonate. Vacuum is applied to the reaction mix and the water is distilled off leaving a substantially anhydrous crude residue. Thereupon the crude hydrazine thiocyanate containing residue is slurried in approximately 1320 parts by weight of kerosene  and the system is refluxed at reduced pressure for two hours at about 120°–122° C. The crude residue exhibits a pH in the range of 5.0 to 5.5 throughout the refluxing operation. The suspension is then cooled and filtered. The white sandy filter cake so obtained is then slurried in approximately 1320 parts by weight of water and filtered. The filter cake is washed free of residual sulfates and dried at 100° C. Approximately 292 parts by weight of thiosemicarbazide (an 80% yield based on hydrazine) is obtained.

While in the above example sodium carbonate was employed to adjust the pH it is to be understood that in instances wherein the system is considered too acidic that other salts of a strong base and a weak acid, e. g., sodium acetate, potassium carbonate, or better still ammonium hydroxide, may be employed, the quantities employed being determined as that required to raise the pH to a value below about 6.0.

As further illustrative of the process of this invention an aqueous solution of hydrazine thiocyanate is prepared by intimately mixing in approximately 1500 parts by weight of water approximately 497.3 parts by weight of NH₂NH₂.H₂SO₄, approximately 152.9 parts by weight of sodium hydroxide, and approximately 309.7 parts by weight of ammonium thiocyanate. The pH of the solution is adjusted to a value within the range of 5.0 to 5.5 by the addition of a small quantity of sodium carbonate, and thereafter the solution is taken to dryness under a 20–25 mm. of mercury vacuum. The anhydrous crude residue so obtained is divided into two equal parts, A and B, and each part is slurried in toluene. To suspension A is added approximately 0.1 parts by weight of 50% sulfuric acid, while nothing is added to suspension B. The respective suspensions are then refluxed for one hour at 108° C. Upon cooling and filtering the respective suspensions and isolating the desired product in each case, it is observed that while a high yield is obtained from B a 6% higher yield is obtained from A. Excellent reaction control is obtained in each of the respective refluxing operations.

While in Example III caustic is employed to neutralize the half-neutralized hydrazine sulfate other materials may be employed such as gaseous ammonia, ammonium hydroxide, potassium hydroxide, caustic soda, and the like. The aforementioned half-neutralized hydrazine sulfate may also be neutralized with hydrazine hydrate.

When the alkali metal thiocyanates are employed as reactants with neutral hydrazine sulfate

in accordance with this invention it has not been found necessary to remove the undissolved sulfates during the course of the reaction. Also in those reactions where ammonium thiocyanate is employed as a reactant with NH₂NH₂.H₂SO₄ neutralized with an alkali metal hydroxide it has been found unnecessary to remove the undissolved sulfates. Although it is preferred to employ concentrated solutions of all of the reactants, dilute solutions are not objectionable.

Although it is preferable to remove all the water present in the reaction mixture obtained by reacting a hydrazine salt of an inorganic acid (except nitric acid) with a water-soluble thiocyanate salt in aqueous medium during the vacuum distillation or other suitable evaporation operation so that the subsequently formed water-immiscible inert organic liquid suspension be completely anhydrous it has been found expedient to obtain a substantially anhydrous hydrazine thiocyanate containing crude residue and remove the last traces of water during the refluxing or heating of the water-immiscible inert organic liquid suspension of the crude residue. Amounts of water up to one per cent remaining in the crude residue subsequent to the water removal operation present no serious problem. However, amounts of water retained in the crude residue in excess of five per cent present a serious problem and materially effect the yield of thiosemicarbazide.

The refluxing of the water-immiscible liquid suspension of the hydrazine thiocyanate in crude or pure state in the rearrangement reaction is ordinarily carried out at temperatures above about 100° C. and usually not over 130° C. While the temperature employed will depend upon the reaction conditions, the refluxing operation is preferably carried out at 115°–125° C. Although atmospheric pressure can be used it has been found preferable to employ reduced pressures.

While the present invention has been described in reference to particular embodiments, variations and modifications thereof may be made which are obvious to those skilled in the art without departing from the spirit or scope of the invention. For example, instead of hydrazine sulfate, neutralized or half-neutralized, the salts of hydrazine with such inorganic acids as hydrochloric acid, hydrobromic acid, phosphoric acid and the like, may be employed in preparing the intermediary hydrazine thiocyanate.

This application is a continuation-in-part of my application Serial No. 186,667, filed September 25, 1950, now abandoned.

What is claimed is:

1. In the process for preparing thiosemicarbazide by the rearrangement of hydrazine thiocyanate, the step which comprises heating a suspension of hydrazine thiocyanate in a water-immiscible inert organic liquid to effect rearrangement to thiosemicarbazide, the reaction system being maintained at a pH in the range of from about 5.0 to about 6.0.

2. In the process for preparing thiosemicarbazide by the rearrangement of hydrazine thiocyanate, the step which comprises refluxing a suspension of hydrazine thiocyanate in a water-immiscible inert organic liquid having a boiling point in the range of 100° C. to about 220° C. to effect rearrangement to thiosemicarbazide, the reaction system being maintained at a pH in the range from about 5.0 to about 6.0.

3. In the process for preparing thiosemicarbazide by the rearrangement of hydrazine thiocyanate, the step which comprises refluxing under reduced pressure and at a temperature in the range of 100° C. to about 130° C. a suspension of hydrazine thiocyanate and ammonium sulfate in a water-immiscible liquid hydrocarbon having a boiling point in the range of 100° C. to about 220° C. to effect rearrangement to thiosemicarbazide, the reaction system being maintained at a pH in the range from about 5.0 to about 6.0.

4. The process of preparing thiosemicarbazide which comprises reacting in an aqueous medium hydrazine sulfate with ammonium thiocyanate in substantially chemically equivalent proportions, evaporating the water to provide a crude residue containing not more than 5% by weight water, admixing the crude residue so obtained with a water-immiscible inert hydrocarbon liquid having a boiling point in the range of 100° C. to about 220° C., refluxing the suspension so obtained under reduced pressure and at a temperature in the range of 100° C. to about 130° C. to effect rearrangement of the hydrazine thiocyanate to thiosemicarbazide, and recovering thiosemicarbazide, the pH of said crude residue throughout the rearrangement reaction being maintained at a pH in the range of from about 5.0 to about 5.5.

5. The process of preparing thiosemicarbazide which comprises reacting in an aqueous medium hydrazine sulfate with ammonium thiocyanate in substantially chemically equivalent proportions, evaporating the water to provide a crude residue containing not more than 1% by weight water, admixing the crude residue so obtained with kerosene, refluxing the suspension so obtained under reduced pressure and at a temperature in the range of 115° C. to about 125° C. to effect rearrangement of the hydrazine thiocyanate to thiosemicarbazide, and recovering thiosemicarbazide, the pH of said crude residue throughout the rearrangement reaction being maintained at a pH in the range of from about 5.0 to about 5.5.

6. The process of preparing thiosemicarbazide which comprises reacting in an aqueous medium hydrazine sulfate with ammonium thiocyanate in substantially chemically equivalent proportions, evaporating the water to provide a crude residue containing not more than 1% by weight water, admixing the crude residue so obtained with toluene, refluxing the suspension so obtained under reduced pressure and at a temperature in the range of 100° C. to about 130° C. to effect rearrangement of the hydrazine thiocyanate to thiosemicarbazide, and recovering thiosemicarbazide, the pH of said crude residue throughout the rearrangement reaction being maintained at a pH in the range of from about 5.0 to about 5.5.

7. The process of preparing thiosemicarbazide which comprises reacting in an aqueous medium hydrazine sulfate with ammonium thiocyanate in substantially chemically equivalent proportions, evaporating the water to provide a crude residue containing not more than 1% by weight water, admixing the crude residue so obtained with xylene, refluxing the suspension so obtained under reduced pressure and at a temperature in the range of 115° C. to about 125° C. to effect rearrangement of the hydrazine thiocyanate to thiosemicarbazide, and recovering thiosemicarbazide, the pH of said crude residue throughout the rearrangement reaction being maintained at a pH in the range of from about 5.0 to about 5.5.

References Cited in the file of this patent

UNITED STATES PATENTS 2,450,406   Bambas _____ Oct. 5, 1948